United States Patent [19]
Ogawa et al.

[11] Patent Number: 4,992,300
[45] Date of Patent: Feb. 12, 1991

[54] MANUFACTURING METHOD FOR A RECORDING MEDIUM OR A RECORDING HEAD

[75] Inventors: Kazufumi Ogawa, Hirakata; Hideharu Tamura, Katano, both of Japan

[73] Assignee: Matsushita Electric Industrial Co., Ltd., Osaka, Japan

[21] Appl. No.: 354,240

[22] Filed: May 19, 1989

[30] Foreign Application Priority Data

May 24, 1988 [JP] Japan ................................ 63-126404
Jun. 2, 1988 [JP] Japan ................................ 63-136401

[51] Int. Cl.⁵ .......................... B05D 3/06; G11B 5/72
[52] U.S. Cl. ...................................... 427/44; 427/38; 427/54.1; 427/128; 427/130; 427/131; 427/430.1; 428/447; 428/694; 428/695; 428/900
[58] Field of Search ..................... 427/128, 430.1, 130, 427/131, 54.1, 38; 428/447, 694, 695, 900

[56] References Cited

U.S. PATENT DOCUMENTS

| 4,677,023 | 6/1987 | Ishizaki et al. | 428/323 |
| 4,699,847 | 10/1987 | Nakayama et al. | 428/522 |
| 4,702,959 | 10/1987 | Shimozawa et al. | 428/323 |
| 4,761,316 | 8/1988 | Ogawa | 428/64 |
| 4,780,366 | 10/1988 | Nishimatsu et al. | 428/323 |

FOREIGN PATENT DOCUMENTS 61-122925 10/1986 Japan .

Primary Examiner—Norman Morgenstern
Assistant Examiner—Roy V. King
Attorney, Agent, or Firm—Stevens, Davis, Miller & Mosher

[57] ABSTRACT

This invention relates to a manufacturing method for a recording medium or a recording head characterized in improving the slide ability of a surface of a recording medium or a recording head, and improvement or their durability by forming a monomolecular film made from silane surfactants on the surface of a recording medium or a head by direct or indirect chemisorption.

4 Claims, 5 Drawing Sheets

MANUFACTURING METHOD FOR A RECORDING MEDIUM OR A RECORDING HEAD

BACKGROUND OF THE INVENTION

This invention relates to a manufacturing method of a magnetic medium such as a magnetic recording medium or a recording head, in more detail, relates to a method of forming a protection film for a recording layer of a magnetic recording mediums such as a magnetic tape, magnetic disc, magnetic card or an optical magnetic recording disc.

Also, it relates to a method of forming a protection film on recording part of a recording head such as a magnetic recording head for a VTR that records analog or digital signals or for a magnetic disc that records or erases digital or analog signals, or an optical magnetic recording head for an optical magnetic recording medium.

Magnetic recording mediums have so far been classified in two types, i.e. coating type and vacuum deposition type.

The method of coating type is to liquidize a mixture of magnetic powder of $\gamma$-$Fe_2O_3$ added with $Fe_2O_3$ or Co in a mixture of polyvinyl-butylal, toluene, methylisobutyl, etc. and coat them on the surface of the body of the medium in the thickness of 4-5 $\mu$m.

By this method, manufacture was easy but there was some limit in making the magnetic powder into fine particles, and therefore the performance was not good enough for high density recording.

On the other hand, in the case of deposition method, the recording density is better than the coating method, but, there is a weakness in durability because the magnetic metal layer is exposed. Accordingly, overcoating is applied to 1000-2000 Å metal which is vacuum-evaporated by electron beam or spattering deposition technique, and some lubricant is applied to the magnetic recording medium to give lubricity. Nevertheless, sufficient durability has not been achieved as yet. In addition, as the overcoating and lubricity can not be applied thinly and uniformly, the gap between the recording layer and the head becomes larger, thus the high density-recording can not be obtained the vacuum evaporation and deposition technique.

As to recording heads, in manufacturing recording heads for conventional VTRs, floppy discs, and the like, such methods are generally used that a magnetic film is formed by deposition on the surface of a body of ceramics, another ceramic layer is placed thereon and the portion thereof that contacts the medium is cut after grinding, and special surface treatment was not made for abrasion-resistance, though grinding at the portion contacting the medium was made. The abrasion-resistance was improved merely by changing the ceramic materials alone.

As a result, conventional recording heads have been apt to damage recording mediums, be very abrasive, and be less reliable.

In view of the faults of the conventional methods mentioned above, the purpose of this invention is to provide a method to form a lubricant layer on a surface of a recording medium or on a recording head thinly and uniformly, without pinholes, to improve the reliability of a recording medium, to realize high density recording, to reduce damage by a head to a recording medium, as well as to improve the reliability of a recording head itself.

OUTLINE OF THE INVENTION

This invention is to form directly or indirectly plural monomolecular films made from silane surfactants on the surface of a magnetic recording layer formed by deposition on the surface of the magnetic recording layer. The method includes a manufacturing process performing the chemical adsorption of a silane surfactant on the surface of the recording layer in monomolecular form, and modifying the functional groups of the silane surfactant by irradiating energy beams (light, electron beam, X-rays, $\gamma$-rays, ion beam, etc.) in an atmosphere containing predetermined gases or plasma treatment after forming the film. The method that conducts these processes repeatedly or the like provides a high density recording medium or a recording head, having such peculiarity that plural layers of monomolecular film are formed as a protection film.

By using the method of this invention, high density organic thin film, in a form that plural monomolecular films as protection films are chemically bonded to each other between each of the layers on a surface of a magnetic recording medium, can be formed in uniform thickness without pinholes, and accordingly, a high performance surface protection film can be formed.

This invention reduces further damage to a recording medium by providing a recording head on which a monomolecular protection film made from silane surfactants is formed. This invention also includes a method to make a film with chemical adsorption of a silane surfactant, directly or indirectly, on a surface of a recording head, or includes process to modify the functional groups of the silane surfactant by irradiating energy beams (light, electron beam, X-rays, $\gamma$-rays, ion beam, etc.) or plasma treatment in an atmosphere that contains predetermined gases, after the film is made by the chemical adsorption of the silane surfactant by chemisorption in form of monomolecular layer on the surface of the recording head. By carrying out these processes several times alternately, plural monomolecular films can be prepared as a protection film.

By the above method, high density organic films as protection films can be obtained in a form that plural monomolecular layers are chemically bonded directly or indirectly to each other between each of the layers on a surface of the magnetic recording medium with pinhole-free, uniform, and thin thickness. As a result, the recording or playback efficiency of the head is improved and the noise is decreased. Additionally, an addition of F (fluorin) to the surface of the monomolecular organic thin film improves lubricity and slidability of the head as a protection film.

BRIEF DESCRIPTIONS OF THE DRAWINGS

FIG. 1 is a conceptual one, and FIGS. 2 to 7 are cross sections views at which circled part A in the FIG. 1 is magnified to molecular level, the cross section show the manufacturing processes.

FIG. 8 is a conceptual one of a magnetic recording head, and FIGS. 9 to 15 show cross sections views of manufacturing process at which the circled part A in the FIG. 8 is magnified to molecular level.

EXAMPLE 1

A manufacturing method of a recording medium is explained as an example of this invention by FIGS. 1 to 7.

Figure 1:
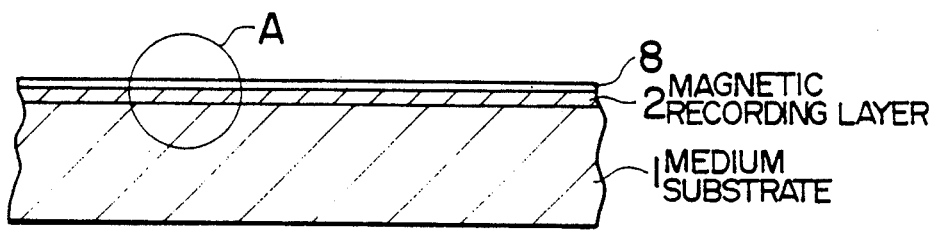
FIGS. 1 to 7 show cross sections views of magnetic recording mediums to explain the manufacturing method of a recording medium of this invention.
Figure 2:
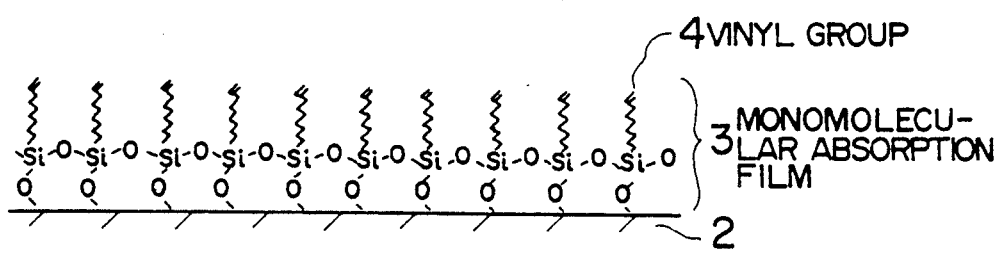
Figure 3:
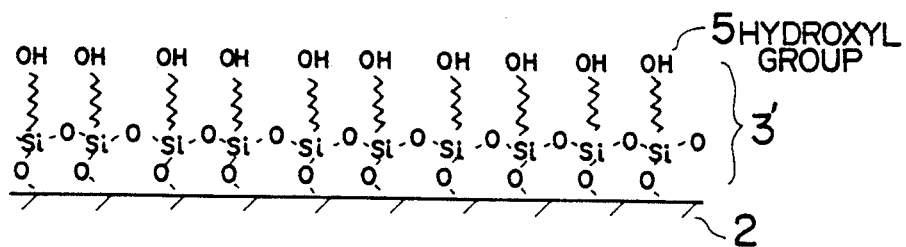
Figure 4:
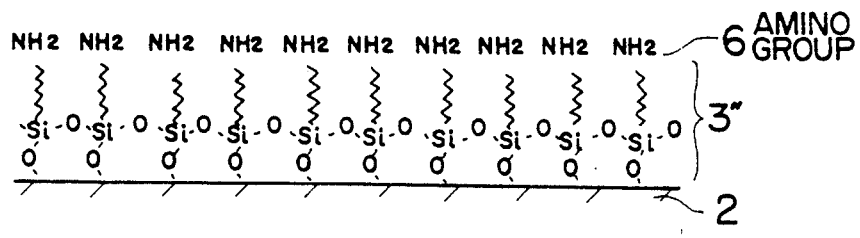

For example, as shown in FIG. 1, after forming a magnetic metal recording layer 2 (magnetic metal and magnetic metal oxide film such as Fe-Ni, Ni-Co) on a magnetic recording disc substrate (medium substrate) 1 by spattering method, etc., the solution containing $CH_2=CH-(CH_2)_n-SiCl_3$ (n : integer. approx. 10 to 20 is the easiest to handle) as silane surfactant dissolving with about $2\times10^{-3}$ to $5\times10^{-2}$ Mol/l, is prepared with the solvent; 80% n-hexane, 12% carbon tetrachloride and 8% chloroform solution, and the said substrate of the medium on which a magnetic recording layer is formed is immersed into the solution. As a result, natural oxide is formed on the surface of the metal which is deposited by vacuum deposition as a magnetic recording layer in air, a bond of

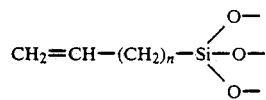

is produced on the surface, and one layer (20-30 Å thick) of monomolecular adsorption film made from silane surfactants is formed.

Figure 5:
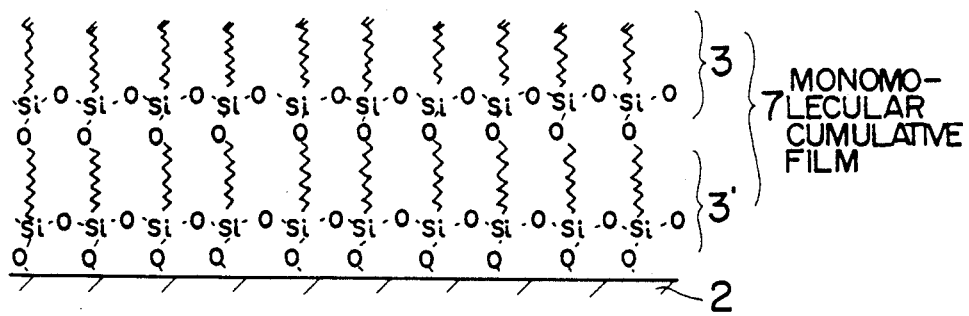
Figure 6:
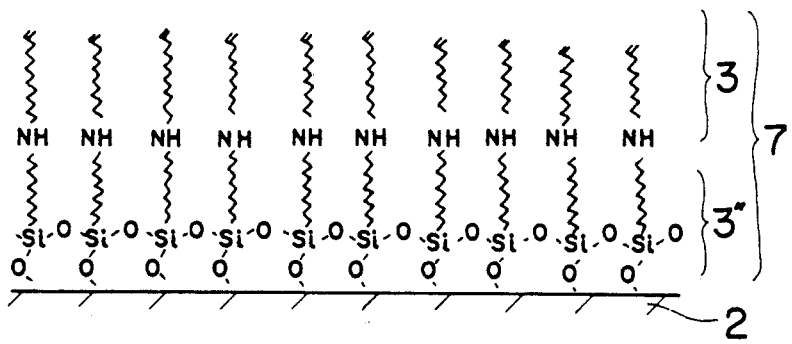

Secondly, energy beams (electron beam, X-rays, γ-rays, ultraviolet rays, ion beam) are irradiated to a vinyl group 4 ($CH_2=CH-$) thereon in an atmosphere which contains Oxygen or $N_2$ (air is acceptable), and formed hydroxyl (—OH) group 5 (FIG. 3) or amino (—NH) group 6 (FIG. 4) at the vinyl group 4. Incidentally, it was proved by FTIR analysis that these functional groups formed after the vinyl group disappeared. Also, the vinyl groups laid on the surface can be reacted to form —OH groups or —NH groups by such method that the vinyl groups are treated in a plasma containing $O_2$ or $N_2$. Similarly, by repeating a chemisorption process and a process to form —OH group or —NH group using the same technique, high density monomolecular cumulative film 7 (protection film 8 (FIG. 1)) is formed in such condition that plural layers of monomolecular films are chemically bonded to each other between each of the layers (as shown in FIG. 5 and FIG. 6.) on the surface of the magnetic recording medium, etc. In addition, when a monomolecular film containing F in the final layer, is to be formed, a monomolecular cumulative film that contains F in the surface can be formed by chemisorption using silicon surfactant containing F such as $CF_3-CF_2-(CH_2)_{16}-SiCl_3$ as a reagent in the last process, or by a plasma treatment after depositing the uppermost monomolecular film on the surface in gases containing F.

On the other hand, by immersing a substrate which was one-layer chemisorbed with silane surfactant into a solution of a long-chain fatty acid (e.g. $CH_3-(CH_2)_n-COOH$, n : 10 to 25), or a solution of long-chain alcohol (e.g. $CH_3-(CH_2)_n-OH$, n : 10-25), a further monomolecular film of a long-chain fatty acid or a long-chain alcohol can be formed on the surface of the said one layer made from silane surfactants physical adsorption.

Figure 7:
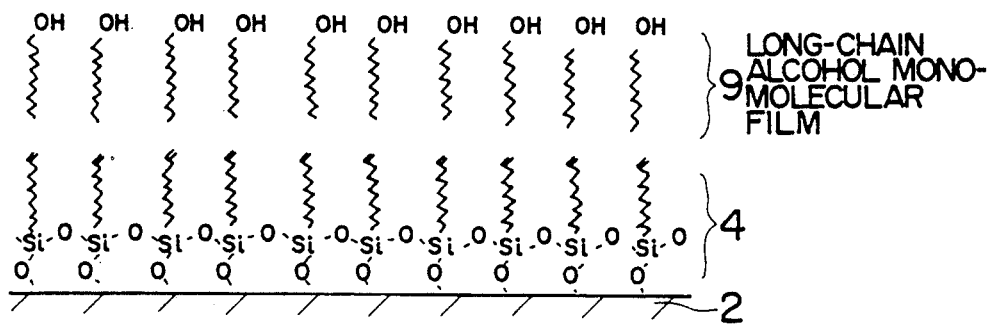
Figure 8:
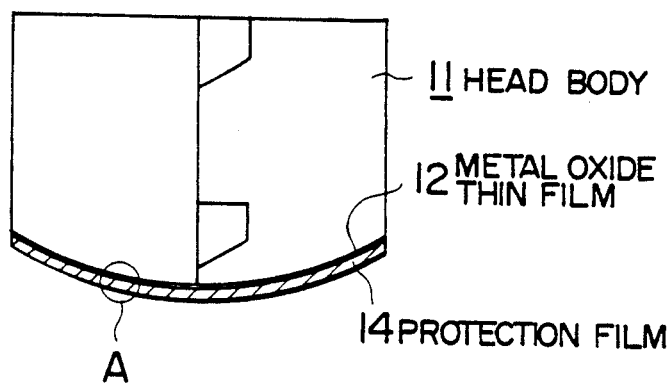
FIGS. 8 to 15 show cross sections views of magnetic recording heads to explain the manufacturing method of a recording head in this invention.

For example, by immersing the substrate in a $10^{-5}$ mol/l solution of $CH_3-(CH_2)_{17}-OH$ at 10° C. for 30 minutes, monomolecular layer of long-chain alcohol is formed with OH group facing the outer surface (FIG. 7).

In the above example, it is shown that a monomolecular film was directly formed on the surface of a magnetic recording medium. Needless to say, the same effect can be obtained by forming a monomolecular film through films of such as C, W, Mo, SiO or $Al_2O$ deposited on the magnetic recording medium. The example was described the case of a magnetic disc, however, it goes without saying that this method can be applied to a magnetic tape and a magnetic card as well as optical magnetic recording medium using a transparent body like PMMA as the medium substrate.

In addition to forming a protection film for a magnetic recording medium, this method can be applied for forming a protection film for an optical recording medium or semiconductor element.

By the method of this invention mentioned above, it is possible to form on the surface of recording medium, or the like, a high density organic thin film in such a condition that plural layers of monomolecular protection films are chemically bonded to each other between each of the layers with pinhole-free and in uniform thickness. Accordingly, if the substrate is a magnetic recording medium, or the like, such a good effect can be expected as to improve recording or reading efficiency of the head and to reduce noise. In other words, using the method of this invention, pinhole-free organic protection film in uniform thickness can be formed by chemisorbing ultra thin films consisting of plural layers of monomolecular film on the surface of the substrate. In addition, by making the organic thin film having lubricity such as a film containg F in the outer surface, the film is provided with lubricity and then, with improved slidability, hence the abrasion-resistance is improved.

The above examples are explained for the cases of using magnetic recording mediums as substrates, but it is apparent that this method can be applied to any material the purpose of which is to improve abrasion-resistance of optical discs and recording mediums, and to protect their surfaces.

In the case that some derivatives of diacetylene (e.g. $CH_2=CH-(CH_2)_n-C\equiv C-C\equiv C-(CH_2)_m-SiCl_3$ (n, m: integer etc.) are used as the materials for chemisorption, it is possible to produce a bridge by irradiating with ultraviolet rays, to provide conductivity in a parallel direction with the monomolecular layer and to prevent electrification of the surface of the substrate.

EXAMPLE 2

The manufacturing method of a recording head is explained by referring to FIGS. 8 to 15 as follows. As shown in the FIG. 8, after forming thin film 12 of high abrasion-resistant metal oxide (e.g. $SiO_2$, $Al_2O_3$, etc.) or metal (W, Mo, etc.), or the like, on the body of the magnetic recording head 11 by a spattering method, or the like, a solution containing about $2\times10^{-3}$ to $5\times10^{-2}$ Mol/l of $CH_2=CH-(CH_2)_n-SiCl_3$ (n: integer, approx. 10 to 20 is the easiest to treat) as the silane surfactant is prepared with the solvent; 80% n-hexane, 12% carbon tetrachloride and 8% chloroform, and the body of the said magnetic recording head is immersed. Here, as the surface of the magnetic recording head contains —OH group, so

Figure 9:
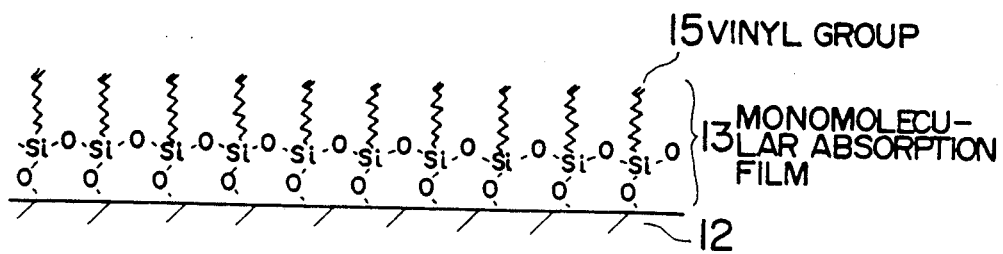
Figure 10:
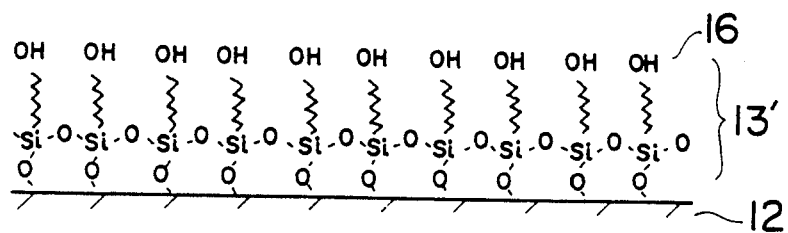
Figure 11:
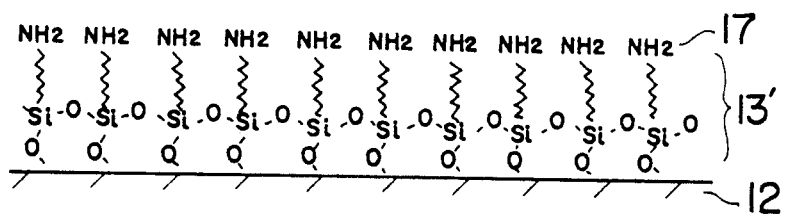

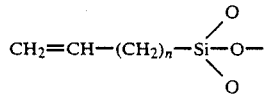

bonding is formed on the surface, and a monomolecular adsorption film 13 is formed from silane surfactants as a protection film in the form of monomolecular layer (20 to 30 Å thick) with chemical bonding (FIG. 9). Therefore, a high density organic thin film is formed in the form that a monomolecular protection film is chemically bonded, with pinhole-free and uniform thickness, improving the efficiency of the magnetic recording/playback of the head as well as reducing its noise.

Figure 12:
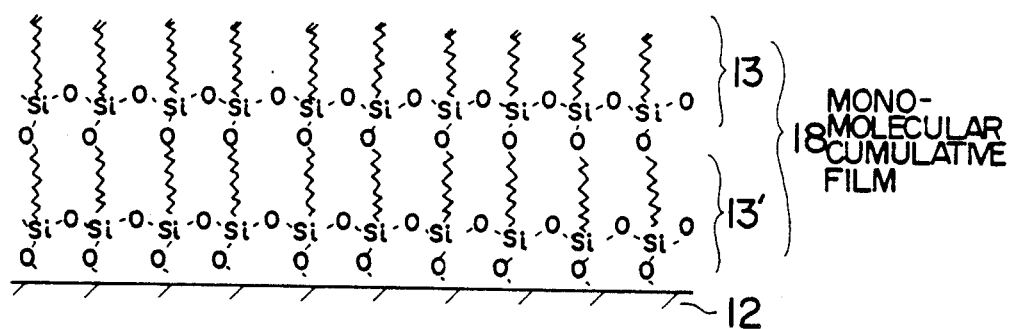
Figure 13:
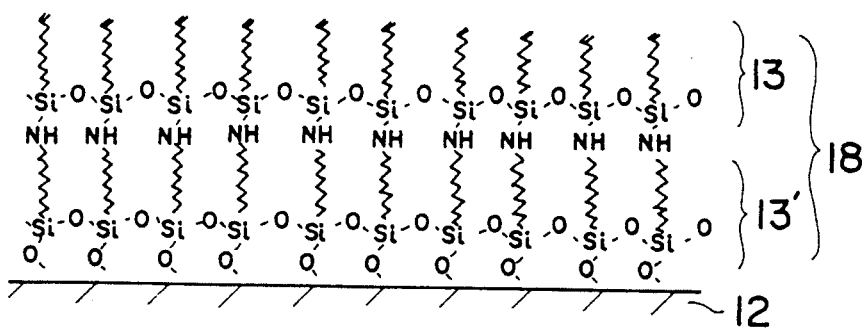

Even in this condition, sufficient lubricity is provided as a monomolecular protection film. In order to further improve the performance, the film is irradiated with energy beams (electron beam X-rays, γ-rays, ultraviolet light, or ion beam) to a vinyl group 15 ($CH_2=CH-$) in the atmosphere containing $O_2$ or $N_2$ (or in the air), and the vinyl group 4 react to form hydroxyl groups (—OH) 16 (FIG. 10) or amino groups (—$NH_2$) 17 (FIG. 11) is added. It was confirmed by FTIR analysis that these functional groups are formed by irradiating the vinyl group. Also, at this stage, the vinyl groups react to form —OH groups or —NH groups by treating in a plasma containing $O_2$ or $N_2$. By repeating the chemisorption process and a process to form —OH group or —NH group with the same reaction liquid, a high density monomolecular cumulative protection film 18 (protection film 14 (FIG. 8)) can be formed on the surface of a magnetic recording head in a form that monomolecular films of plural monomolecular layers which are chemically bonded to each other between each of the layers (FIGS. 12 and 13). Accordingly, a high density organic thin film, in a form that protection films of plural monomolecular layers chemically bonded to each other between each of the layers, can be formed thinly on the surface of recording head with pinhole-free and uniform thickness.

Figure 14:
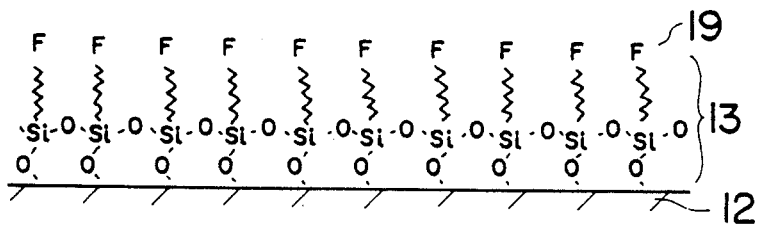

In addition, when a monomolecular film that contains F in the surface is to be formed, a monomolecule cumulative film containing F in its surface can be formed by chemisorption using silicon surfactant that contains F, e.g. $CF_3—CF_2—(CH_2)_{16}—SiCl_3$ as a reagent in the last adsorption process, or by treating the uppermost monomolecular film with plasma in gases containing F (FIG. 14). Therefore, by adding F to the surface of an organic thin film on the surface of the head the protection film is given lubricity, thus the slidability of the head is improved.

On the other hand, by immersing a substrate on which a monomolecular layer made from silane surfactant by one layer chemisorption, into a water solution of a long-chain fatty acid (e.g. $CH_3—(CH_2)_n—COOH$, n: 10 to 25) or a solution of a long-chain alcohol (e.g. $CH_3—(CH_2)_n—OH$, n: 10 to 25), a further monomolecular film of long chain fatty acid or of long-chain alcohol can be formed by physical adsorption on the surface of one layer made from silane surfactants mentioned above (FIG. 15).

Figure 15:
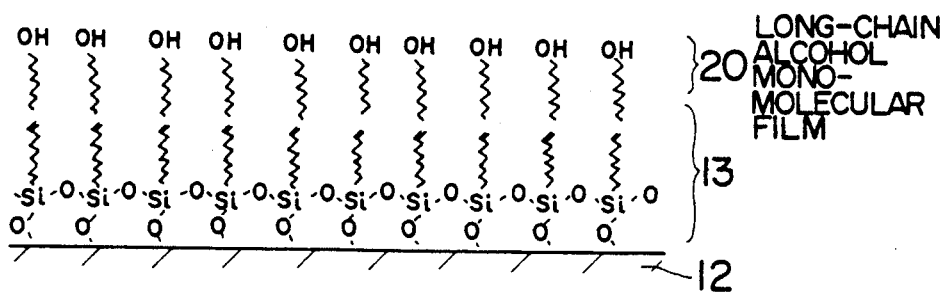

For example, when a substrate is immersed in a $10^{-5}$ mol/l solution of $CH_3—(CH_2)_{17}—OH$ at 10° C for 30 minutes, one layer of a long-chain alcohol monomolecular film 20 can be formed by physical adsorption in a form that the OH group faces the outer surface (FIG. 15). As a result, the lubricity of the head was further improved.

When a derivative of diacetylene (e.g. $CH_2=CH—(CH_2)_n—C\equiv C—C\equiv C—(CH_2)_m SiCl_3$ (n, m: integer), or the like, is used as chemisorption material, it is possible to give a conductivity in a parallel direction with the monomolecular layer by producing a polydiacetylene bridge by irradiating ultraviolet light, and accordingly, the electrification of the surface of the head body can be prevented.

The above examples are those of forming a monomolecular film through metal oxide or metals films indirectly on the surface of the head. Since the magnetic recording head is generally made of ceramics or magnetic metals, it is unnecessary to say that a similar effect can be obtained by forming a monomolecular adsorption protection film directly on the head surface.

In the above examples the cases of using a magnetic recording head as the head are explained, but the method can be applied to every sort of recording head as far as the purpose of the method are to improve the abrasion-resistance of a laser head for optical disc and stylus, as well as to protect the surface of all the recording heads, VTRs, magnetic disc equipments, or optical magnetic disc equipments, etc. which records electrical signals, i.e. analog or digital, by using these recording heads.

By the method mentioned above, a high density organic thin film, in the form that a monomolecular protection film or a protection films of plural monomolecular layers chemically bonded to each other between each of the layers, can be formed very thinly on the surface of a recording head with pinhole-free and in uniform thickness, thus the efficiency of the magnetic recording or playback of the head is improved and thus the noise is decreased a large performance of the head is provided Moreover, by making the surface of the monomolecular organic thin film containing F or by making it bilayer structure, it is possible to give the protection film lubricity and to improve its slidabilities. As a result, a large effect to improve abrasion-resistance of the head is provided. Another effect decreasing damage to the recording media such as magnetic discs and magnetic tapes is also provided.

Consequently, applications of this method to VTRs, magnetic disc equipments, optical magnetic disc equipments, etc. which record analog or digital signals, greatly improve the performance of the equipments.

We claim:

1. A manufacturing method for a recording medium having such character that after the process step a. is effected, the process steps b. and c. are repeated several times wherein the process steps a., b. and c. are described below:
   a. forming a recording layer on the surface of a substrate of a recording medium,
   b. forming one layer of a monomolecular film by chemical adsorption of a silane surfactant on the recording layer, wherein the silane is a linear chain containing an unsaturated hydrocarbon group at one end and a chloro silyl group at the other end, said monomolecular film being formed directly on the recording layer through bonding of silicons of the surfactant and oxygens on the recording layer, or through another previously layered film on the recording layer through bonding of silicons of the surfactant and oxygens of said another layer on the recording layer;

c. after forming one layer of the monomolecular film, irradiating said film with a high energy beam or treating said film with plasma in an atmosphere that consists essentially of $N_2$ to form at least —NH groups at outer vinyl groups of the film or consists essentially of $O_2$ to form at least —OH groups at outer vinyl groups of the film to chemisorb the silane surfactant on said layer of the monomolecular film.

2. A manufacturing method for a recording medium comprising forming a recording medium, forming one layer of a monomolecular film by chemical adsorption of silane surfactants, the silane of which is a linear chain containing chloro silyl group at one end, through bonding of silicons of the silane surfactants and oxygens on the surface of the recording medium, or, through another previously layered film on the surface of the recording medium through bonding of silicons of the surfactants and oxygens of said another layer on the surface of the recording medium, on said another layer, said process including the steps of adsorbing and accumulating a further layer of a long-chain fatty acid or a long-chain alcohol on the monomolecular film by immersing the medium in an aqueous solution of said long-chain fatty acid or said long-chain alcohol.

3. A manufacturing method for a recording head having such character that the following process steps a. and b. are repeated several times:

a. forming one layer of a monomolecular film by chemical adsorption of silane surfactants, the silane of which is a linear chain containing an unsaturated hydrocarbon group at one end and a chloro silyl group at the other end, through bonding of silicons of the surfactants and oxygens on the surface of the recording head, or, through another previously layered film on the surface of the head through bonding of silicons of the surfactants on said another layer and oxygens of said another layer on the surface of the recording head, b. after forming one layer of the monomolecular film, irradiating said film on the recording head with a high energy beam or treating with plasma in an atmosphere consisting essentially of $N_2$ to form at least —NH groups at outer vinyl groups of the film or consisting essentially of $O_2$ to form at least —OH groups at outer vinyl groups of the film to chemisorb the silane surfactants on said one layer of the monomolecular film.

4. A manufacturing method for a recording head comprising:

a. forming one layer of a monomolecular film by chemisorbing silane surfactants, the silane of which is a linear chain containing chloro silyl group at one end, directly on the surface of the head through bonding of the silicons of the surfactant and oxygens on the surface of the head, or, through another previously layered film on the surface of the recording layer through bonding of silicons of the surfactants and oxygens of said another layer on the surface of the recording head, on said another layer, b. adsorbing and accumulating a further layer of a monomolecular film of a long-chain fatty acid or a long-chain alcohol by immersing the head in an aqueous solution of said long-chain fatty acid or said long-chain alcohol.

* * * * *